(12) United States Patent
Ponstein

(10) Patent No.: US 8,240,418 B2
(45) Date of Patent: Aug. 14, 2012

(54) PIVOT-STEERED VEHICLE

(75) Inventor: Joachim Ponstein, Gondershausen (DE)

(73) Assignee: Bomag GmbH, Boppard (DE)

( * ) Notice: Subject to any disclaimer, the term of this patent is extended or adjusted under 35 U.S.C. 154(b) by 89 days.

(21) Appl. No.: 12/698,332

(22) Filed: Feb. 2, 2010

(65) Prior Publication Data
US 2010/0230929 A1 Sep. 16, 2010

(30) Foreign Application Priority Data
Feb. 2, 2009 (DE) .......................... 10 2009 007 092

(51) Int. Cl.
*B62D 5/06* (2006.01)
*B62D 53/00* (2006.01)
(52) U.S. Cl. ......... 180/235; 180/418; 180/420; 280/400
(58) Field of Classification Search .................. 180/235, 180/418, 419, 420; 280/400
See application file for complete search history.

(56) References Cited

U.S. PATENT DOCUMENTS

| | | | | |
|---|---|---|---|---|
| 3,451,494 A | * | 6/1969 | Kowalik | 414/697 |
| 3,814,531 A | * | 6/1974 | Carnahan et al. | 404/117 |
| 4,505,349 A | * | 3/1985 | Murphy | 180/420 |
| 4,793,735 A | | 12/1988 | Paukert | |
| 5,052,707 A | * | 10/1991 | Timan | 280/403 |
| 5,234,069 A | * | 8/1993 | Krone et al. | 180/419 |
| 5,732,789 A | * | 3/1998 | Stephenson | 180/418 |
| 6,039,133 A | * | 3/2000 | Zulu | 180/6.64 |
| 6,581,718 B1 | * | 6/2003 | Vigren et al. | 180/420 |
| 6,604,351 B2 | * | 8/2003 | Dillon | 56/14.6 |
| 6,722,685 B2 | * | 4/2004 | Koch et al. | 280/499 |
| 7,743,869 B2 | * | 6/2010 | Flournoy et al. | 180/235 |
| 8,020,495 B2 | * | 9/2011 | Muller et al. | 105/3 |
| 2008/0041655 A1 | * | 2/2008 | Breiner et al. | 180/418 |

FOREIGN PATENT DOCUMENTS

| | | | |
|---|---|---|---|
| DE | 3441625 A1 | 5/1986 | |
| DE | 4219635 A1 | 12/1993 | |

* cited by examiner

*Primary Examiner* — Lesley D Morris
*Assistant Examiner* — Marc Scharich
(74) *Attorney, Agent, or Firm* — Baker & Hostetler LLP

(57) ABSTRACT

A pivot-steered vehicle, in particular a pivot-steered construction vehicle or machine, is provided. The vehicle includes a front frame and a rear frame which are connected to each other via a pivot steering gear and a steering drive. The pivot steering gear has a first and a second vertical pivot axis which are arranged opposing each other with respect to a longitudinal axis of the vehicle in a neutral position, the pivot steering gear being embodied in a first steering range for relative swiveling of the front frame and the rear frame about the first pivot axis and in a second steering range for relative swiveling of the front frame and the rear frame about the second pivot axis, the first and the second steering ranges being separated from each other via the neutral position.

11 Claims, 7 Drawing Sheets

PIVOT-STEERED VEHICLE

CROSS-REFERENCE TO RELATED APPLICATIONS

This application claims priority to foreign patent application DE 10 2009 007092.3, filed on Feb. 2, 2009, the disclosure of which is incorporated herein by reference in its entirety.

FIELD OF THE INVENTION

The present invention relates to a pivot-steered vehicle, in particular, a pivot-steered construction vehicle or machine.

BACKGROUND OF THE INVENTION

Outstanding maneuverability and turnability, based on comparatively large steering angles and small turning radii, have helped to establish pivot steering as a type of steering in vehicles with at least two vehicle frames each having at least one rigid axle. In particular construction vehicles, such as for example vibratory rollers with two vehicle frames in each of which a tire is mounted, are often controlled with the aid of pivot steering.

Conventional pivot-steered vehicles frequently use a central pivot joint which connects the two vehicle frames on the axis of symmetry in the longitudinal direction, that is to say the longitudinal centre axis. The steering drive used is in this case usually a double-acting hydraulic cylinder which is articulated at its ends to the two vehicle frames. Depending on the desired change in the direction of travel, the piston rod of the hydraulic cylinder is extended or retracted by actuation of a pressure medium so that, viewed in the direction of travel, either the left or the right lateral edges of the vehicle frames are swiveled relative to one another.

The maximum settable pivot or steering angle of a central pivot joint of this type results from the geometrical context. The smaller the spacing between the front frame and the rear frame becomes, the smaller the maximum settable steering angle becomes, as otherwise the edges of the vehicle frames will abut one another. If a larger steering angle is striven for in order to improve maneuverability, this inevitably increases the size of the free space between the frame edges in which the pivot joint is located, giving rise to a broad range of drawbacks. On the one hand, the total length of the vehicle is increased in size; this can present difficulties during transportation, etc. Furthermore, the increase in the size of the free space between the frame edges in the longitudinal direction increases the axial spacing, as a result of which the size of the turning radius is increased while the steering turn remains the same. Furthermore, the increase in the size of the spacing between the vehicle frames is also associated with increased consumption of materials. Alternatively, in order to increase the steering turn, instead of increasing the size of the spacing between the vehicle frames, the critical frame outer edge regions, in particular corner regions, which delimit the steering turn by abutment, can be recessed and provided with a radius. Although this does not increase the size of the overall length, the recessed regions are nevertheless lost, so that the space in or on the vehicle frames for arranging machine components is reduced.

In relatively small construction machines, such as for example trench rollers, an overall length which is as short as possible is striven for, wherein there must still be sufficient space for arranging machine components. At the same time, it is necessary for the trench roller to be able to perform a steering angle which is as large as possible in order to be able to turn even in narrow and curvy trenches.

A pivot-steered agricultural vehicle with two swivel axes spaced apart from one another is known. A disadvantage of the principle applied in the pivot steering of this vehicle is that the adjustment apparatus for steering the vehicle necessarily entails a relatively large amount of construction room in the longitudinal direction of the vehicle. It is also disadvantageous that a separate adjustment device, for example a hydraulic cylinder, is required for creating a pivoting movement about each swivel axis, which increases the cost and decreases the effectiveness of the steering apparatus.

SUMMARY OF THE INVENTION

Embodiments of the present invention advantageously provide a pivot-steered vehicle, in particular a pivot-steered construction vehicle or a construction machine, that includes a front frame and a rear frame, a pivot-steering gear with a first connecting member, the first connecting member being connected via two rotary joints to the front frame and the rear frame, and a steering drive that is connected to the front frame and the rear frame via articulation points. The pivot-steering gear exhibits a first and a second vertical pivot axis arranged at a distance apart from one another, wherein the pivot-steering gear is formed in a first steering range for the relative swivel of the front frame and the rear frame about the first pivot axis and in a second steering range for the relative swivel of the front frame and the rear frame about the second pivot axis, wherein the first and the second steering ranges are separated from one another by a neutral position.

An easy-to-use, pivot-steered vehicle is provided, in which, despite a shortened overall length, it is possible to set a large steering angle without the frame edges abutting one another during the steering process and without the volumes of the vehicle frames being reduced in size, so that there is sufficient space for arranging machine components.

A pivot-steering gear with a second connecting member is connected to the front frame and the rear frame by means of two further rotary joints, the articulation of this connection bearing an inverse relation to the articulation of the connection of the first connecting member, the longitudinal axis of the second connecting member in the neutral position being parallel to the longitudinal axis of the first connecting member and the pivot axes of the rotary joints of the second connecting member in the neutral position being each arranged coaxially to the pivot axes of the rotary joints of the first connecting member. The line of application of the steering drive in the neutral position is arranged parallel to and axially spaced apart from the longitudinal axes of the connecting members.

The vehicle according to embodiments of the invention comprises a pivot steering gear having two vertical pivot axes set apart from each other. The term "vertical" means in this context perpendicular to the base of the vehicle. The two pivot axes, about which the front frame and the rear frame can be swiveled relative to each other for a steering movement, are arranged opposing each other in a neutral position of the vehicle, preferably with respect to a longitudinal axis of the vehicle, for example the longitudinal centre axis. In this case, the horizontal line connecting both pivot axes must not orthogonally intersect the longitudinal axis in question when the vehicle is viewed from above.

The neutral position of the vehicle defines that position separating a first steering range from a second steering range. With regard to steering, the vehicle according to embodiments of the invention therefore comprises three states, that is to say the state in the first steering range, the neutral position and the state in the second steering range, only one state being present at any given time. For example, the vehicle according to embodiments of the invention can perform a turn to the left (first steering range), straight-ahead driving (neutral position) and a turn to the right (second steering range). When changing the steering range, an automatic change from one pivot axis to the other pivot axis also takes place at the same time. Preferably, the neutral position describes that position in which the longitudinal axes, in particular the axes of symmetry in the longitudinal direction, of both vehicle frames are oriented in alignment with each other or at least parallel to each other. In other words, the neutral position of the vehicle preferably means the unturned setting of the vehicle. In the neutral position, the vehicle preferably drives straight ahead and the vehicle frames do not swivel about the two pivot axes.

Embodiments of the invention may use, instead of a single, central pivot joint having a single pivot axis, a pivot steering gear having two pivot axes set apart from each other. The pivot steering gear is embodied in the first steering range for relative swiveling of the front frame and the rear frame, the relative swiveling movement of the frames being carried out solely about the first pivot axis. Accordingly, the pivot steering gear ensures in the second steering range relative swiveling of the front frame and the rear frame merely about the second pivot axis. The term "relative pivoting of the frames" refers to three cases of relative movement, that is to say simultaneous swiveling of both frames in opposite directions, i.e. both frames swivel toward each other or away from each other about a common pivot axis, or only the front frame moves and pivots in relation to the rear frame which remains stationary with regard to the relative movement, or the rear frame moves and rotates in relation to the stationary front frame. In all cases, the relative swiveling of the frames leads to the steering movement.

Advantages of the vehicle according to various embodiments of the invention include the reduced overall length despite relatively large steering angles. This is due to the high compactness of the pivot steering gear in the longitudinal direction, according to embodiments of the invention. Compared to conventional vehicles, a larger steering angle is possible in both steering ranges while the spacing between the front frame and the rear frame remains the same. Furthermore, compared to conventional vehicles, the overall length is greatly reduced while the steering angle remains the same, as the size of the space for fitting the pivot steering gear between the front frame and the rear frame can be considerably reduced. The corner regions, which are recessed in conventional vehicle frames, are no longer necessary in the vehicle according to embodiments of the invention, as there is no risk of the vehicle frames abutting each other, so that the designer can design the vehicle frames to the greatest extent independently of the dimensions of the pivot steering gear. This results in more free spaces when arranging the components in or on the vehicle frames, such as for example the engine, tank, electrical systems, hydraulics, remote control, water tank, etc. This also allows more possible configurations in the design.

The second connecting member is connected to the front frame and the rear frame via an articulation that bears an inverse relation to that of the first connecting member. The connecting members are each connected to the front frame and the rear frame by means of two, i.e. a total of four, rotary joints. In order to better understand what is meant by the "inverse articulation" of the connecting members, it is helpful to break the articulations down by defining a "left" and a "right" side in the transverse direction (i.e. the left and the right side of the longitudinal centre axis of the vehicle in the neutral position when viewed in the direction of travel) as well as an "upper" and a "lower" plane in the vertical direction. The four rotary joints can thus be subdivided into an "upper left," an "upper right," a "lower left" and a "lower right" rotary joint. The "lower left" rotary joint is, for example, linked to the "lower right" rotary joint in the "lower plane" via the first connecting member, wherein the "lower left" rotary joint is arranged on the rear frame and the "lower right" rotary joint is arranged on the front frame. In the neutral position, the "upper left" rotary joint is vertically aligned with the "lower left" rotary joint and the "upper right" rotary joint is vertically aligned with the "lower right" rotary joint. The second connecting member links the "upper right" rotary joint with the "upper left" rotary joint in the "upper plane." In accordance with the "inverse articulation" of the second connecting member relative to the first connecting member, the "upper left" rotary joint is arranged on the front frame and the "upper right" rotary joint is arranged on the rear frame. Each frame thus has an "upper" and a "lower" rotary joint, which are arranged opposite one another relative to the longitudinal centre axis of the vehicle in the neutral position. The rotary axes of the "left" rotary joints are in vertical alignment with one another and form one of the pivot axes. Conversely, the pivot axes of the "right" rotary joints are in vertical alignment with one another and form the other pivot axis. When the vehicle in the neutral position is viewed from above, the longitudinal axes of the connecting members overlap and transverse the longitudinal centre axis of the vehicle on different planes. If one were hypothetically to pull the frames out of the neutral position in opposite directions, the longitudinal axes of the connecting members would form a "cross" or an "X" when viewed from above as a result of the aforementioned "inverse articulation."

Expediently, the pivot axes are arranged symmetrically opposing each other with respect to the longitudinal centre axis of the vehicle in the neutral position so that, when the vehicle is viewed from above, in the neutral position, the line connecting the two pivot axes is intersected by the longitudinal centre axis of the vehicle perpendicularly and into two parts of equal width. The longitudinal centre axis of the vehicle is in this case that axis which, in the neutral position of the vehicle, runs through the centre of gravity of the vehicle and is arranged perpendicularly to the two vehicle axes, in particular tire axes. The symmetrical embodiment of the vehicle and the symmetrical arrangement of the pivot axes with respect to the longitudinal centre axis allow safe operation of the vehicle when driving straight ahead and also uniform steering behavior in both steering ranges.

Expediently, the first steering range encompasses a first steering angle of from $0<\alpha<80°$ and the second steering range encompasses a second steering angle of from $0<\beta<80°$. Regardless of whether the front frame and the rear frame swivel, starting from the neutral position, into a predefined steering angle or the relative swiveling movement is carried out, with an inverted direction of rotation, toward the neutral position or the steering angle turned is temporarily fixed, it should be the case that a steering angle of from $0<\alpha<80°$ is present for the first steering range. Accordingly, a steering angle of from $0<\beta<80°$ applies to the second steering range, wherein $\alpha$ and $\beta$ each specify the angle enclosed, when a turned vehicle is viewed from above, by two straight lines which each run parallel to the leading edges of the vehicle frames and intersect each other in the pivot axis in question about which the swiveling movement of the vehicle frames has been carried out. For example, the vehicle can drive, starting from straight-ahead driving, viewed in the direction of travel, toward the left when a steering angle $\alpha$, which is in the first steering range, is set. Many vehicles, in particular construction vehicles, can reverse, i.e. invert the direction of travel, without turning. That means that a vehicle which inverts the direction of travel, so that the front frame then follows the rear frame viewed in the direction of travel, now performs, during a steering turn into the first steering range at a steering angle $\alpha$, a movement toward the right. The steering angle can in theory be continuously set, in both steering ranges, in a range of from 0 to 80°. However, preferably, a steering angle in a range of from 0 to 50° is selected in order not to jeopardize the tilt resistance of the vehicle.

In order to increase compactness, the pivot axes are expediently arranged in the region between the front frame and the rear frame, preferably centrally between the mutually facing leading edges of the vehicle frames, and in the region of the lateral edges of the front frame or the rear frame, the first pivot axis being arranged, viewed in the direction of travel, in the region of the left lateral edges and the second pivot axis being arranged in the region of the right lateral edges of the front frame or the rear frame. The region of a lateral edge is in this case to be defined by a region which takes up, starting from this lateral edge in the direction of the longitudinal centre axis in the neutral position, about 20%, preferably 10%, of the total weight of the front frame or the rear frame. As a result, the pivot axes, which are arranged, viewed in the longitudinal direction, preferably centrally between the front frame and rear frame, are at a spacing from each other that is as large as possible without the width of the vehicle, which is defined substantially by the width of the frames, being unnecessarily increased in size. It is thus possible to maximize the steering angle in both steering directions without the risk of both vehicle frames abutting each other. However, it would also be conceivable to arrange the pivot axes, if required, outside the width of the vehicle as delimited by the lateral edges of the frames.

The pivot steering gear connects the front frame and the rear frame in a first embodiment crosswise. The connection "crosswise" is simply another term for the "inverse articulation" already described. In this case, both the front frame and the rear frame each have at least two articulation points which are set apart from one another, the vertical axes of rotation of which correspond to the pivot axes and which are connected to one another crosswise by means of suitable connecting members, so that in each case an articulation point of the front frame is connected to an articulation point of the rear frame that opposes said articulation point of the front frame with respect to the longitudinal centre axis of the vehicle in the neutral position. Compared to a conventional centrally articulated vehicle having just a single articulation point, the vehicle according to embodiments of the invention offers the advantage that the forces and moments which occur are split up onto a plurality of points during steering and driving so that it is possible to use, instead of a single massive articulation point, for example a rotary joint, a plurality of smaller rotary joints. Furthermore, the straight-ahead running properties are also improved compared to conventional centrally articulated vehicles, as the symmetrical articulation of the frames via the lateral frame outer edges eliminates the need to carry out steering corrections.

The pivot steering gear expediently comprises in this case a first and a second pair of rotary joints each forming a pivot axis. Each pair of rotary joints has an upper and a lower rotary joint arranged vertically relative to each other, so that their axes of rotation are vertically aligned. In the neutral position, the rotary joints of both pairs of rotary joints are each positioned vertically relative to each other. The rotary joints can be designed in the conventional manner by means of journals and bushes, preferably with rolling bearings arranged therebetween. One of the upper rotary joints is arranged on the front frame. Likewise, one of the lower rotary joints is arranged on the front frame, this lower rotary joint being arranged opposing the upper rotary joint of the front frame with respect to the longitudinal centre axis. The other upper rotary joint and the other lower rotary joint are accordingly arranged on the rear frame, so that each pair of rotary joints has a rotary joint connected to the front frame and a rotary joint connected to the rear frame. In a cross-sectional view of the pivot steering gear in the neutral position, the imaginary line connecting the rotary joints connected to the front frame would intersect the imaginary line connecting the rotary joints connected to the rear frame.

The first connecting member is preferably a steering plate. The second connecting member is preferably a connecting arm that is narrower in comparison with the steering plate. In this case, the upper rotary joints are preferably connected in a first horizontal plane via the connecting arm. The lower rotary joints are preferably connected via a steering plate in a second horizontal plane arranged preferably below the first horizontal plane. The term "horizontal" means in this case parallel to the base of the vehicle. The arrangement over two planes allows the pivot steering gear according to embodiments of the invention to be designed in an extremely compact and stable manner, the spacing between the front frame and rear frame being shortened to a minimum. The longitudinal axes of the connecting arm and the steering plate are arranged in the neutral position one above the other and transversely to the longitudinal centre axis of the vehicle. Preferably, they are arranged in the neutral position perpendicularly to the longitudinal centre axis of the vehicle and substantially centrally in the free space between the front frame and the rear frame in order to increase the compactness of the pivot steering gear still further. The connecting arm with the upper rotary joints and the steering plate with the lower rotary joints jointly form in a simple and robust manner an articulated crosswise connection between the front frame and the rear frame over two planes. The connecting arm serves mainly to guide the relative movement between the front frame and rear frame. The steering plate performs, in addition to the function of restrictedly guiding the movement, above all the function of transmitting the forces and moments required for steering.

The described crosswise connection to the connecting arm and the steering plate fixes the kinematics of the pivot steering gear according to embodiments of the invention. In the first steering range having the steering angle $\alpha$, the vertically aligned axes of rotation of the first pair of rotary joints act as the first pivot axis. The steering angle $\alpha$ is in this case enclosed by the longitudinal axes of the connecting arm, which runs in the first steering range parallel to the leading edge of the rear frame, and the steering plate, which runs in the first steering range parallel to the leading edge of the front frame, the connecting arm being articulated with the aid of the upper rotary joint of the first pair of rotary joints and the steering plate being articulated with the aid of the lower rotary joint of the first pair of rotary joints on the first pivot axis, albeit in two different planes. The second pair of rotary joints, which opposes the first pair of rotary joints forming the first pivot axis, is in this case "suspended," so that the axes of rotation of the rotary joints of the second pair of rotary joints are not vertically aligned, but spatially separated. When the pivot steering gear, which is turned to $\alpha$ in the first steering range, is viewed from above, the common axis of rotation of the first pair of rotary joints, that is to say the first pivot axis, forms together with the axes of symmetry of the rotary joints of the second, "suspended" pair of rotary joints an isosceles triangle, the sides of the triangle, which are defined relative to one another over the respective spacings of the upper rotary joints and the lower rotary joints, enclosing an angle of α.

The described crosswise connection with four rotary joints and two connecting members in two planes allows a compact, robust and maintenance-friendly design of the pivot steering gear. It goes without saying that, in addition to the preferred exemplary embodiment which has been described in detail, an alternative implementation of the pivot steering gear is also possible in which, for example via mechanical or electromagnetic closing mechanisms, alternately only one pair of rotary joints is engaged, i.e. forms the pivot axis, and the opposing pair of rotary joints is released for swiveling.

The connecting arm and the steering plate are to be understood as rigid members between the respective rotary joints. A certain elasticity may optionally be taken into account in the selection of materials and the design of the joint connecting members in order in this way to counteract oscillating movements which occur as a consequence of ground unevenness and associated loading of the rotary joints. Alternatively, the vehicle can have an additional pendulum joint.

The pivot steering gear has, in an advantageous embodiment of the invention, a first and a second stop element, in the first steering range the first stop element resting between the front frame and the steering plate and in the second steering range the second stop element resting between the rear frame and the steering plate. The stop elements, which are for example substantially right parallelepiped, perform a plurality of functions, some of which vary in accordance with the steering range. In the neutral position of the vehicle, they ensure, together with the width of the steering plate, a defined spacing between the front frame and the rear frame and thus prevent "compressing" of the pivot steering gear. In the first steering range, the first stop element is clamped between the steering plate and the rear leading edge of the front frame. It thus acts as a stop and spacer. It transmits, at least in part, forces and moments from the steering plate to the front frame and vice versa, thus relieving the load on the rotary joints. In the first steering range, the second stop element, which is arranged either on the rear frame or on the side of the steering plate that is positioned opposite the first stop element, has no function. However, in the second steering range, the second stop element is in contact with the steering plate on one side and with the front leading edge of the rear frame on the other side and acts as a stop, spacer and transmission element for forces and moments between the steering plate and the rear frame. The stop elements thus play an important part both in straight-ahead running and in steering.

The stop elements are expediently arranged on the side of the steering plate or connected to the steering plate. They can either be designed integrally with the steering plate or be connected to the steering plate in a force-transmitting, form-fitting or material-uniting manner by means of suitable connecting technologies.

It has been found to be advantageous for the pivot steering gear to comprise a first steering lever connected to the front frame and a second steering lever connected to the rear frame, which steering levers are arranged in the neutral position opposing each other with respect to the longitudinal centre axis of the vehicle. Preferably, the two lower rotary joints of the second plane are each arranged on one of these steering levers, so that the steering plate establishes an articulated connection between the two steering levers and thus between the front frame and the rear frame. At its ends, the steering drive is articulated to the steering levers via further articulation points, preferably rotary joints, at a defined spacing from the longitudinal axis of the steering plate. The defined spacing corresponds to the length of a lever arm on the respective steering lever, as a result of which a moment around the reference point, that is to say the lower rotary joint, is generated from a force acting on the articulation point of the steering drive. In the neutral position of the vehicle, the longitudinal axis of the steering drive is arranged at this spacing parallel to the longitudinal axis of the steering plate and preferably in the same horizontal plane. This arrangement of the steering drive allows a conventional, double-acting piston/cylinder unit to be used as a steering drive. Preferably, the piston/cylinder unit is actuated hydraulically, as a hydrostatic drive for travel and for the working means, from which the pressure medium for the steering actuation can be derived, is present anyway, in particular in construction vehicles and construction machines.

The pivot steering gear preferably has a horizontally positioned steering square, the corner points of which are formed by the rotary joints arranged on the steering levers and the sides of which are formed by the steering plate, the steering drive and the two mutually opposing steering levers. In this case, at least one lateral length of the steering square can be variably set by altering the length of the steering drive. In the neutral position, the steering square preferably describes a trapezoid, in particular an equilateral trapezoid with two mutually parallel sides, that is to say the longitudinal axes of the steering plate and the steering drive, and two mutually opposing sides of equal length, that is to say the lever arms of the steering levers. The steering movement can be introduced in a very compact and simple manner with the aid of the arrangement of the steering levers, steering plate and the steering drive in the form of a steering square. Starting from the neutral position, actuating forces at the two articulation points of the steering drive act on the steering levers when pressure medium is introduced onto one of the two sides of the piston. This changes the length of the steering drive, for example by extending or retracting the piston rod of the hydraulic cylinder, resulting ultimately in swiveling of the front frame relative to the rear frame about one of the two pivot axes. The change in length of the steering drive, in addition to the actuating pressure, may be adduced as a variable for setting a desired steering angle in a desired steering range, as mathematically the steering angle may be calculated with the aid of the difference in length of the steering drive and also the three other known lateral lengths of the steering square, which are preferably constant. The steering square changes its form depending on the lateral length which is present and is variably set by way of the steering drive, wherein, on account of the steering kinematics, depending on the steering range, substantially in each case only one corner point of the steering square changes its position in relation to the position in the neutral position. The possibility of varying the length can be extended by using a telescopic cylinder.

The connecting arm, the steering plate with the stop elements and also the steering drive are arranged, when running straight ahead, transversely to the longitudinal centre axis of the vehicle, in particular perpendicularly thereto. In this case, they act as three rigid connecting members which fix the position of the front frame relative to the rear frame, so that the spacing between them is not increased in size or reduced in size. If the steering drive is actuated and the vehicle is thus steered, starting from the neutral position into one of the two steering ranges, then the front frame and the rear frame perform, on account of the steering kinematics predefined by the pivot steering gear, a swiveling movement either about the first pivot axis or about the second pivot axis. The actuating forces or steering moments required for steering are transmitted mainly in the second plane onto the front frame and the rear frame via the steering levers. The connecting arm in the first plane can be designed so as to be lighter and simpler compared to the steering plate, as it serves mainly to guide the swiveling movement. On actuation of the steering drive, the pivot steering gear according to embodiments of the invention therefore allows only two restrictedly guided swiveling movements, that is to say the relative swiveling of the frames either about the first or about the second pivot axis. Apart from that, no further relative movements between the front frame and the rear frame are possible.

The pivot steering gear according to various embodiments of the invention may be a flat guide gear. In a flat gear, all the axes of rotation are parallel and the paths of movement of member points are positioned in parallel planes. Guide gears are gears in which one member is guided in such a way that it assumes specific positions or that points of the member describe specific paths. These conditions are met by the pivot steering joint according to embodiments of the invention.

According to an advantageous embodiment, the steering plate has at least one through-borehole. This through-borehole can serve to feed-through lines, for example hydraulic lines, or cables, for example power or signal cables. Likewise, the through-borehole can be provided at the two openings with possibilities for connection, so that the through-borehole itself serves as a part of a line. For example, lubricants for lubricating the rotary joints can be passed through the steering plate.

The vehicle according to various embodiments of the invention may be a construction vehicle or a construction machine, in particular a vibratory roller for soil compaction, particularly preferably a trench roller. Trench rollers have to be extremely turnable. Furthermore, they should have an overall length which is as short as possible in order to facilitate frequent transportation from and to the site of use. The vehicle according to embodiments of the invention is ideal as a vibratory roller of this type. In addition, other areas of use in pivot-steered construction vehicles and construction machines would also be conceivable when it is desirable to achieve good maneuverability with at the same time a compact design.

The steering drive is preferably a double-acting hydraulic cylinder with a piston rod. The provision of a linear motor as steering drive would also be conceivable. It is important that, by virtue of the kinematics of the inventive pivot-steering gear, a single double-acting hydraulic cylinder or linear motor is sufficient in order to generate a steering movement about both the first and the second pivot axes.

BRIEF DESCRIPTION OF THE DRAWINGS

A preferred exemplary embodiment of the invention will be described hereinafter in greater detail with reference to the drawings, in which.

DETAILED DESCRIPTION

Figure 1:
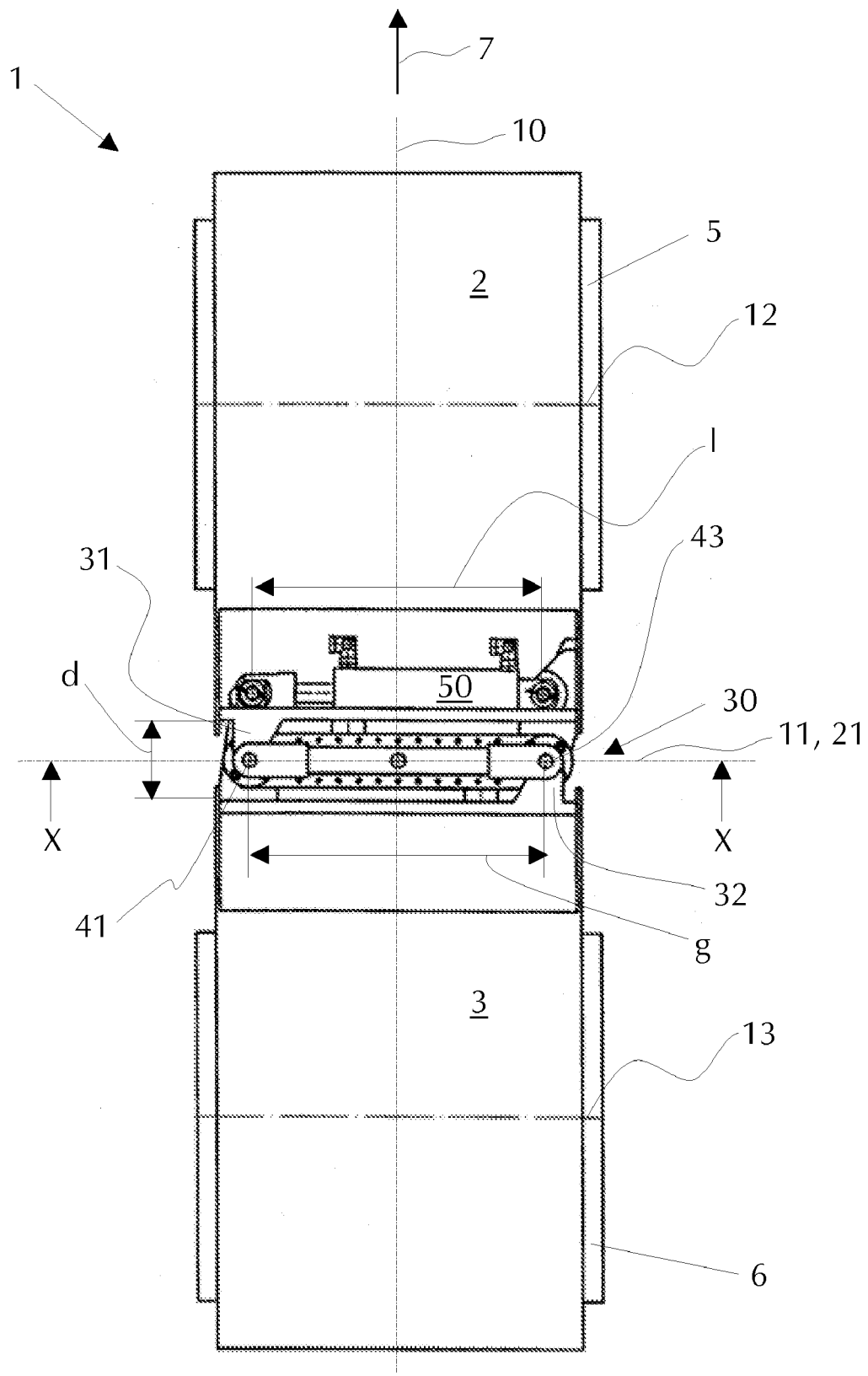
FIG. 1 is a schematic plan view onto an exemplary embodiment of the invention.
Figure 2:
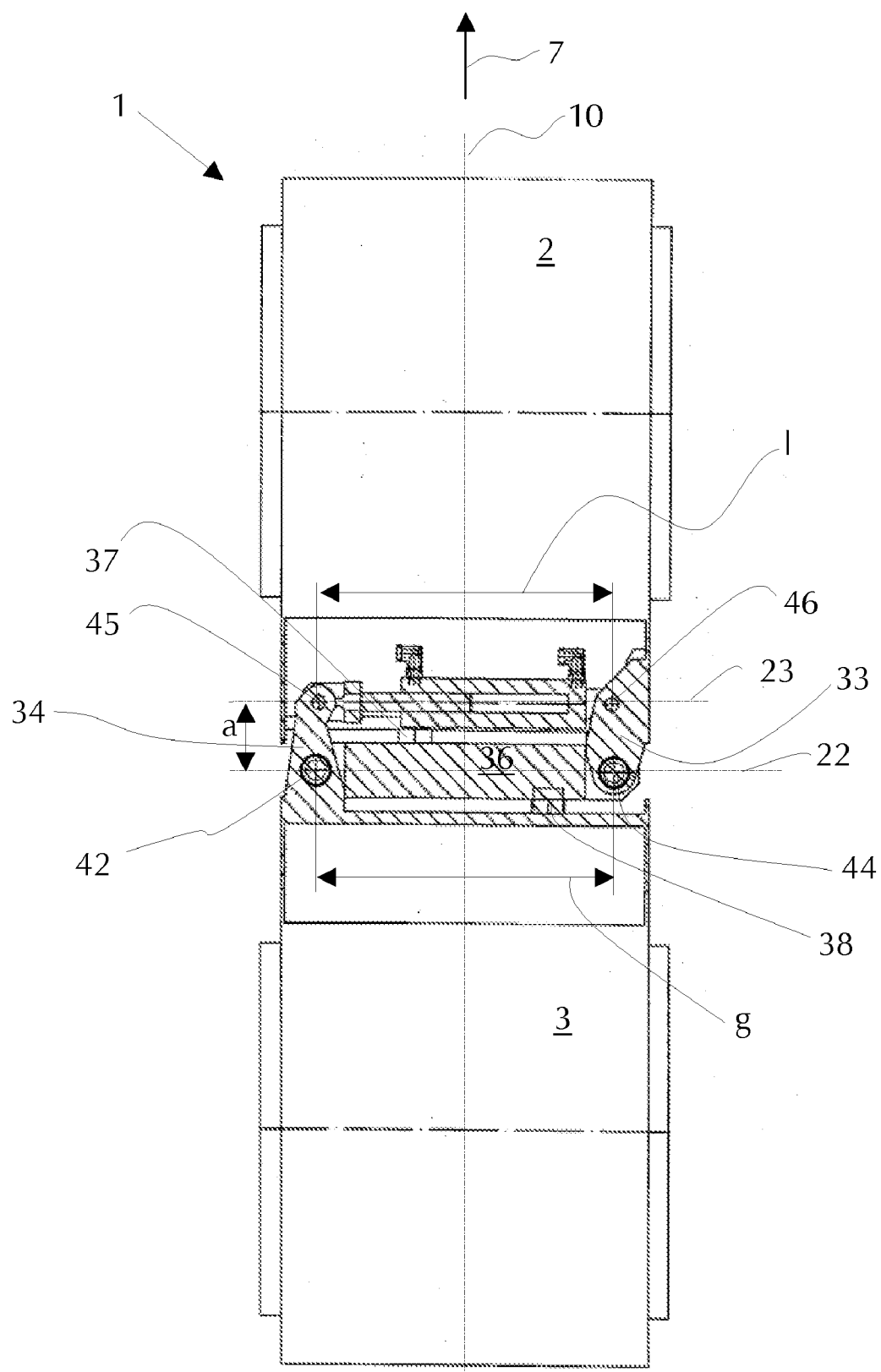
FIG. 2 is a schematic plan view similar to FIG. 1, albeit with a longitudinal section of the pivot steering gear and the steering drive through the plane E2 (FIG. 3)

FIGS. 1 and 2 are plan views onto an exemplary embodiment of the vehicle 1 according to an embodiment of the invention in the neutral position. The illustrated vehicle 1 is a soil compaction roller, in particular a trench roller, with vibration and travel drive, with a front frame 2 and a rear frame 3. The front frame 2 has a front tire 5 having a front axis 12. Accordingly, the rear frame 3 comprises a rear tire 6 having a rear axis 13. The vibratory roller 1 shown is constructed substantially symmetrically to the longitudinal centre axis 10 and to the transverse axis 11. The pivot steering gear 30 connects the front frame 2 and the rear frame 3 in two horizontal planes E1, E2 in an articulated manner and crosswise to each other.

Figure 3:
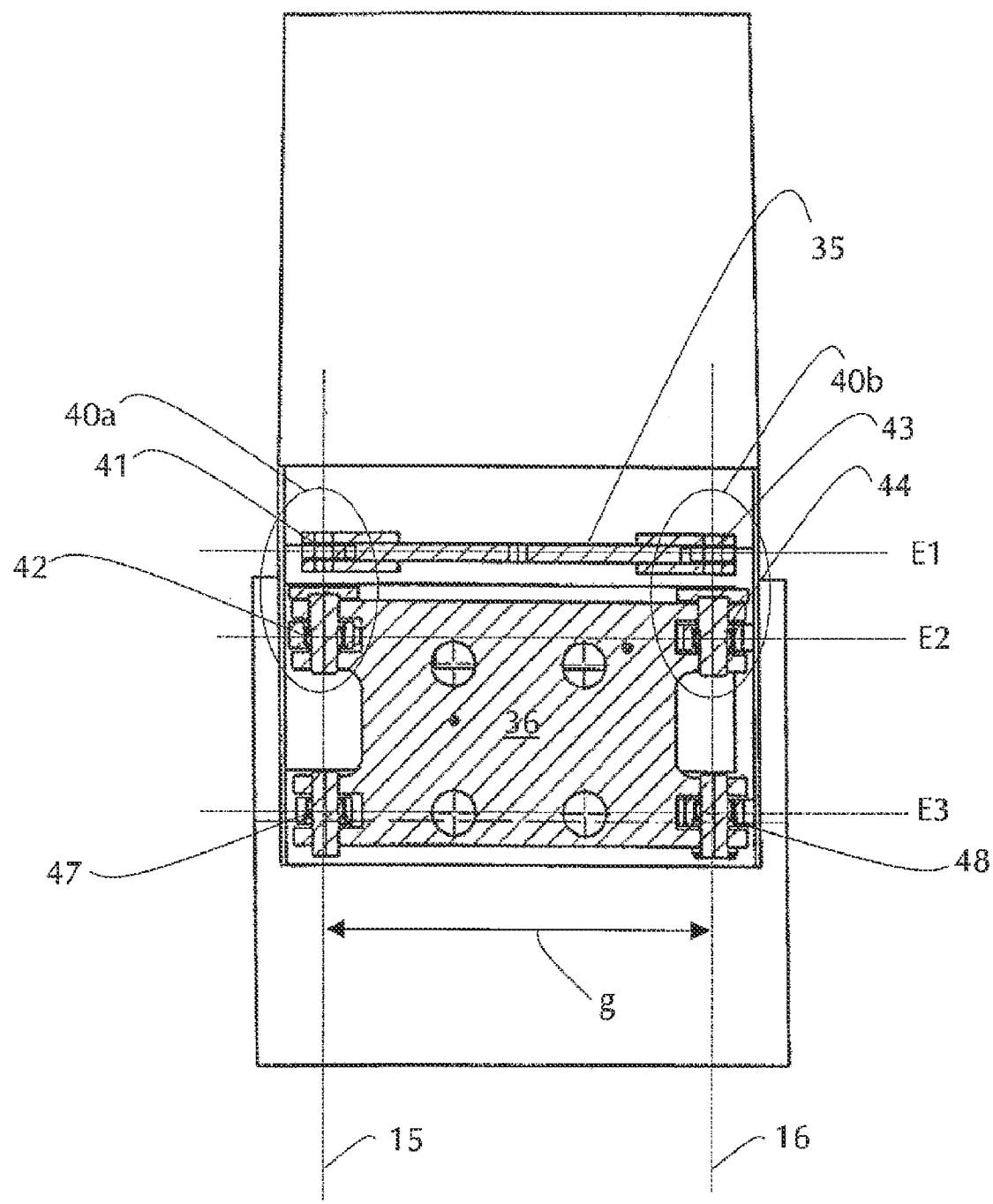
FIG. 3 is a schematic cross-sectional view of the vehicle along the line X-X from FIG. 1.

FIG. 1 clearly shows the first horizontal plane E1 of the pivot steering gear 30 with the upper rotary joints 41, 43. The two upper rotary joints 41, 43 are positioned set apart from each other by a spacing "g" and symmetrically opposing each other with respect to the longitudinal centre axis 10 of the roller 1, so that the spacing "g" is halved by the longitudinal centre axis 10. The first pair of rotary joints 40a with the upper rotary joint 41 and the lower rotary joint 42 forms the first pivot axis 15 (FIG. 3). Likewise, the second pair of rotary joints 40b with the upper rotary joint 43 and the lower rotary joint 44 forms on the opposing side of the roller the second pivot axis 16 (FIG. 3).

The pivot steering gear 30 is arranged substantially in an intermediate region between the front frame 2 and the rear frame 3, the rear leading edge 2a of the front frame 2 being at a spacing "d" from the front leading edge 3a of the rear frame 3. In conventional pivot-steered vehicles, the spacing "d" between the front frame 2 and the rear frame 3 is larger by a multiple than in the vehicle 1 according to the invention. In the design of the free space with a spacing "d" between the frames 2, 3, the desired maximum steering turn and the striven-for vehicle width are very important in conventional pivot-steered vehicles. If one of the two variables is to be increased, then this means that the size of the spacing "d" must also be increased. Nevertheless, in the vehicle 1 according to the invention, the pivot steering gear 30 can be designed to the greatest extent independently of the vehicle frames 2, 3 and free from restrictions of this type. The spacing "d" between the frames 2, 3 remains at all times at a minimum value. The connecting arm 35 connects the upper rotary joints 41, 43 to each other in the first plane E1, the upper rotary joint 41 of the first pair of rotary joints 40a being arranged on a holding part 31 which is securely connected to the front frame 2 and the upper rotary joint 43 of the second pair of rotary joints 40b being arranged on a holding part 32 which is securely connected to the rear frame 3. The longitudinal axis 21 of the connecting arm 35 is arranged in the neutral position parallel to the transverse axis 11 of the roller 1.

FIG. 2 is the same plan view as FIG. 1, albeit with a pivot steering gear 30, which is intersected by the second plane E2, and a steering drive 50. The lower rotary joint 42 of the first pair of rotary joints 40a is connected to the lower rotary joint 44 of the second pair of rotary joints 40b via the steering plate 36, the longitudinal axis 22 of the steering plate 36 being arranged vertically below the longitudinal axis 21 of the connecting arm 35 and perpendicularly intersecting the longitudinal centre axis 10 of the vehicle 1. The spacing "d" between the front frame 2 and the rear frame 3 results from the width of the two stop elements 37, 38, which are connected to the steering plate 36, and the width of the steering plate 36, so that in the neutral position the first stop element 37 rests against the front frame 2 and the second stop element rests against the rear frame 3. The first steering lever 33, which carries the lower rotary joint 44 of the second pair of rotary joints 40b and the second rotary joint 46 of the steering drive 50, is securely connected to the front frame 2. Opposing said first steering lever, the second steering lever 34, which carries the lower rotary joint 42 of the first pair of rotary joints 40a and the first rotary joint 45 of the steering drive 50, is securely connected to the rear frame 3. The rotary joints 45, 46, which are connected to one another via the steering drive 50, are at a spacing "l" which is slightly smaller than the spacing "g." The longitudinal axis 23 of the steering drive 50 is arranged in the plane E2 parallel to the longitudinal axis 22 of the steering plate 36 at a spacing "a," this spacing "a" corresponding during steering operation to a lever arm. The rotary joints 42, 44, 46, 45 thus describe a steering square in the second plane E2, in particular an equilateral trapezoid with two mutually opposing parallel sides of length "g," "l" and also two mutually opposing, equally long sides of length "a."

In the neutral position illustrated in FIGS. 1 and 2, the roller 1 travels straight ahead in the direction indicated by the arrow 7. The roller 1 is provided with a reversing device (not shown), so that it can also travel in the opposite direction. For the purposes of clear marking, the designations "front frame 2" and "rear frame 3" will be maintained irrespective of the orientation or direction of travel. When running straight ahead, the steering plate 36, the connecting arm 35 and the steering drive 50 rigidly connect the front frame 2 and the rear frame 3 to each other, so that no relative movement between the front frame 2 and the rear frame 3 can occur. The spacing "d" between the frames 2, 3 remains constant, provided that the neutral position is present.

FIG. 3 is a cross section of the vehicle 1 according to the invention along the line X-X from FIG. 1. The first pair of rotary joints 40a with the rotary joints 41, 42 form the first pivot axis 15. The second pivot axis 16 is formed by the second pair of rotary joints 40b with the rotary joints 43, 44. Depending on the case of application, additional rotary joints 47, 48, which each help to form the first pivot axis 15 or the second pivot axis 16, can optionally be arranged on the steering plate 36 in a third horizontal plane E3. This may for example be required if the steering plate 36 is to withstand, on account of a relatively large design of the vehicle 1, relatively high actuating forces and steering moments. In the example shown, the connecting arm 35 is designed as a simple connecting rod.

Figure 4:
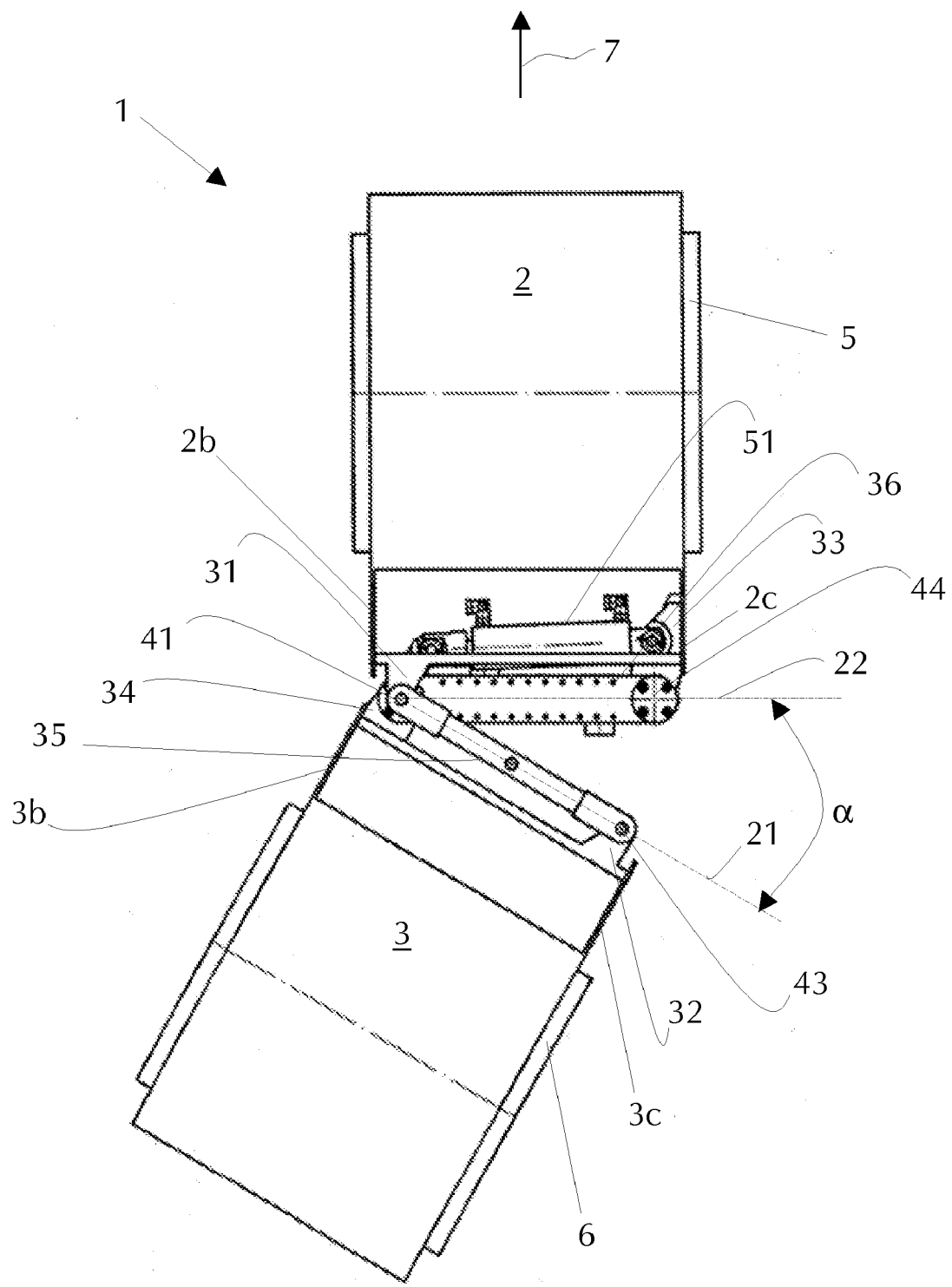
FIG. 4 is a schematic plan view of the vehicle from FIG. 1, albeit in the first steering range.

FIG. 4 is a plan view of the roller 1 in the first steering range. The first steering range encompasses a steering angle of from $0<\alpha<80°$, this steering angle $\alpha$ being enclosed by the longitudinal axes 21, 22 intersecting each other in the first pivot axis 15. If the roller 1 travels in arrow direction 7, then the steering angle $\alpha$ about the first pivot axis leads to a change in the direction of the roller 1 toward the left (viewed in the direction of travel). On viewing of the pure movement of the frames 2, 3 relative to each other by an observer moving with the first pivot axis 15, the left lateral edges 2b, 3b of the frames 2, 3, as viewed in the direction of travel 7, swivel relative to each other. In this exemplary embodiment, the rear frame 3 swivels in the first steering range in relation to the stationary front frame 2 if the steering turn were performed when the vehicle 1 is stationary. The right lateral edges 2c, 3c of the frames 2, 3, as viewed in the direction of travel, move apart, so that the upper rotary joint 43 and the lower rotary joint 44 of the second pair of rotary joints 40b, the axes of rotation of which were previously aligned in the neutral position, now also move apart from each other. The axes of rotation of the rotary joints 41, 43, 44 now form an isosceles triangle having the triangle side lengths "g" and the tip angle $\alpha$. In the example shown, the front tire 5 and the rear tire 6 run, owing to the symmetrical design of the roller 1 with respect to the transverse axis 11, in a track.

Figure 5:
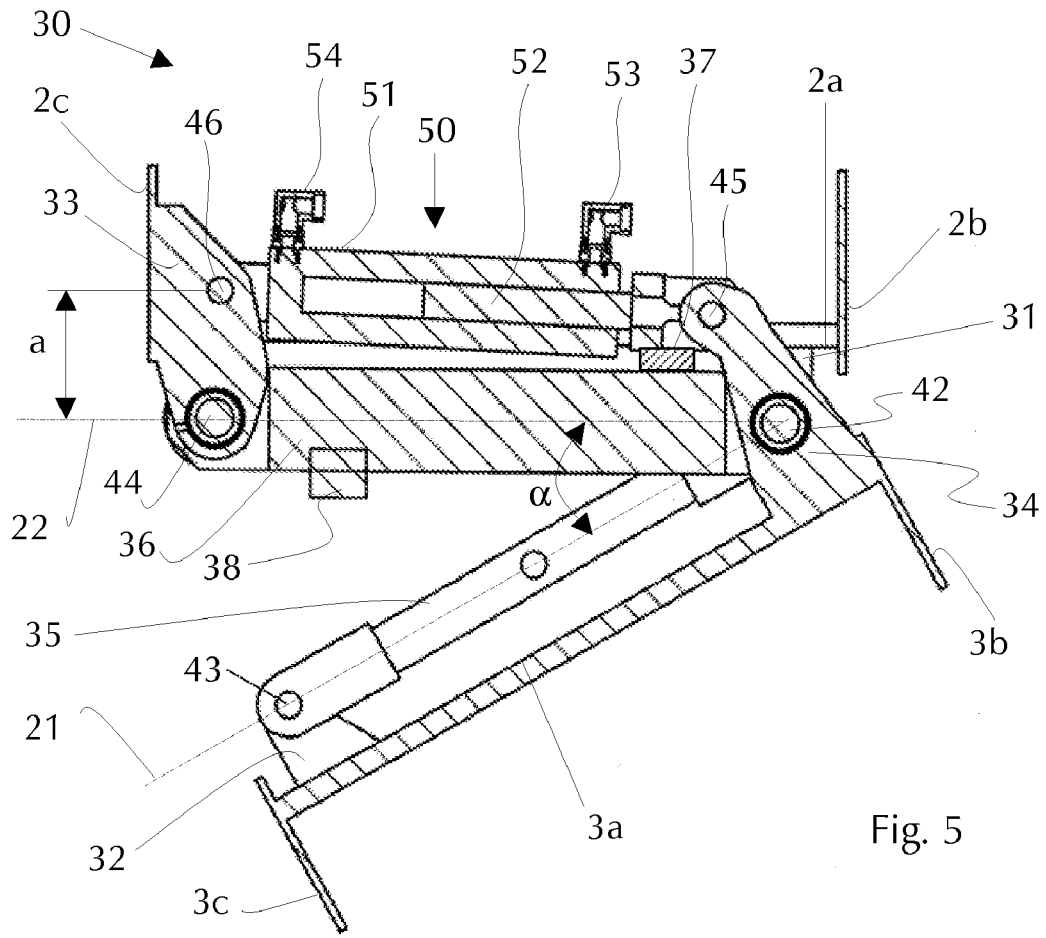
FIG. 5 is a schematic view from below of the pivot steering gear from FIG. 4 with a longitudinal section through plane E2 in the first steering range.

FIG. 5 is a view from below of the pivot steering gear 30 in the first steering range like FIG. 4, albeit with a longitudinal section through the second plane E2, in order to describe the steering state in greater detail. The trigger of the steering movement into the first steering range is the actuation of the steering drive 50. The steering drive 50, which in this exemplary embodiment is designed as a double-acting hydraulic cylinder 51 with a piston rod 52 and two hydraulic connections 53, 54, is actuated, the first hydraulic connection 53 serving as the inflow for the pressurized hydraulic oil and the second hydraulic connection 54 serving as the return flow for the hydraulic oil located in the cylinder 51, so that the piston rod 52 could slide into the cylinder 51. The steering square 42, 44, 46, 45 changes its form as a consequence of the actuation of the steering drive 50, as the spacing of the rotary joints 45, 46 is shortened from originally l in the neutral position now to l' (cf. FIG. 6).

Figure 6:
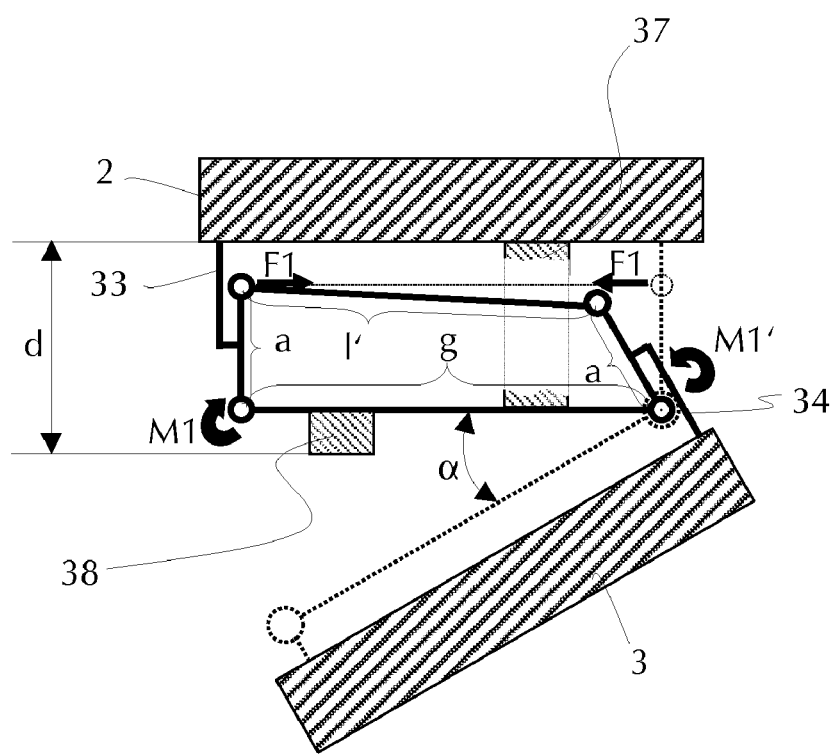
FIG. 6 is a schematic sketch of the steering movement in the first steering range, similar to FIG. 5.

FIG. 6 shows in highly simplified form the steering principle in the first steering range, like FIG. 5. For the sake of clarity, in FIG. 6, the spacing d/2 between the front frame 2 and the longitudinal axis 22 of the steering plate 36 is increased in size in comparison to FIG. 5 in order to avoid overlapping illustrations as far as possible. For the sake of completeness, it should be noted that in the illustrated exemplary embodiment the steering drive 50 protrudes at least partly into the front frame 2, i.e. is arranged outside the intermediate region, defined by the spacing "d," between the front frame 2 and the rear frame 3. FIG. 6 shows the pivot steering gear 30 from FIG. 5, the decisive rotary joints being illustrated as circles and the longitudinal axes of the rigid gear members being illustrated as lines for the sake of simplicity. In addition, the acting actuating forces F1 and also the steering moments M1, M1' are indicated. Likewise, the most important dimensions of the steering square 42, 44, 46, 45 and spacings "l," "a," "g," "d" are charted. The stop elements 37, 38 as well as the frames 2, 3 may also be seen.

Starting from the neutral position, the steering movement is introduced into the first steering range as follows. As a result of the hydraulic actuation of the steering drive 50, actuating forces F1 act on the two articulation points of the steering drive 50, that is to say the rotary joints 45, 46. A first steering moment M1 results from the lever arm having the length "a" on the first steering lever 33, wherein the rotary joint 46 and also the first steering lever 33 are, together with the front frame 2, substantially shackled and can be moved neither in rotation about the rotary joint 44 nor in translation. The first steering lever 33, the front frame 2 and also the first stop element 37 together with the steering plate 36 absorb the first force F1 causing the moment M1, the aforementioned machine parts performing substantially no movement. On the opposing side, a second steering moment M1' around the rotary joint 42 acts, as a consequence of the force F1 with the lever arm of length "a," on the second steering lever 34, as a result of which the rear frame 3, which is securely connected to the second steering lever 34, swivels freely about the rotary joint 42 by the angle $\alpha$. In addition, the swiveling movement of the rear frame 3 relative to the front frame 2 is restrictedly guided via the connecting arm 35 and the upper rotary joint 41 which are located in the first plane E1. The rotary joints 41, 42 of the first pair of rotary joints 40a form the first pivot axis 15 for the first steering range. Irrespective of the direction of rotation of the rear frame 3 relative to the front frame 2, each relative rotational movement of the frames 2, 3 in the first steering range only ever takes place about the first pivot axis 15. The actuation of the steering drive 50 leads, as a function of the pressure set, to a displacement of the rotary joint 45, in particular a rotation about the rotary joint 42, so that the variable lateral length of the steering square is reduced from "l" (neutral position) to l'. Provided that the condition applies that l'<l, the state is in the first steering range. If α is to be reduced in size again in the direction of the neutral position, then the pressure medium must act on the opposite side of the piston with the aid of the second hydraulic connection. If the neutral position is reached, then the following applies: α=0 and l'=l.

Figure 7:
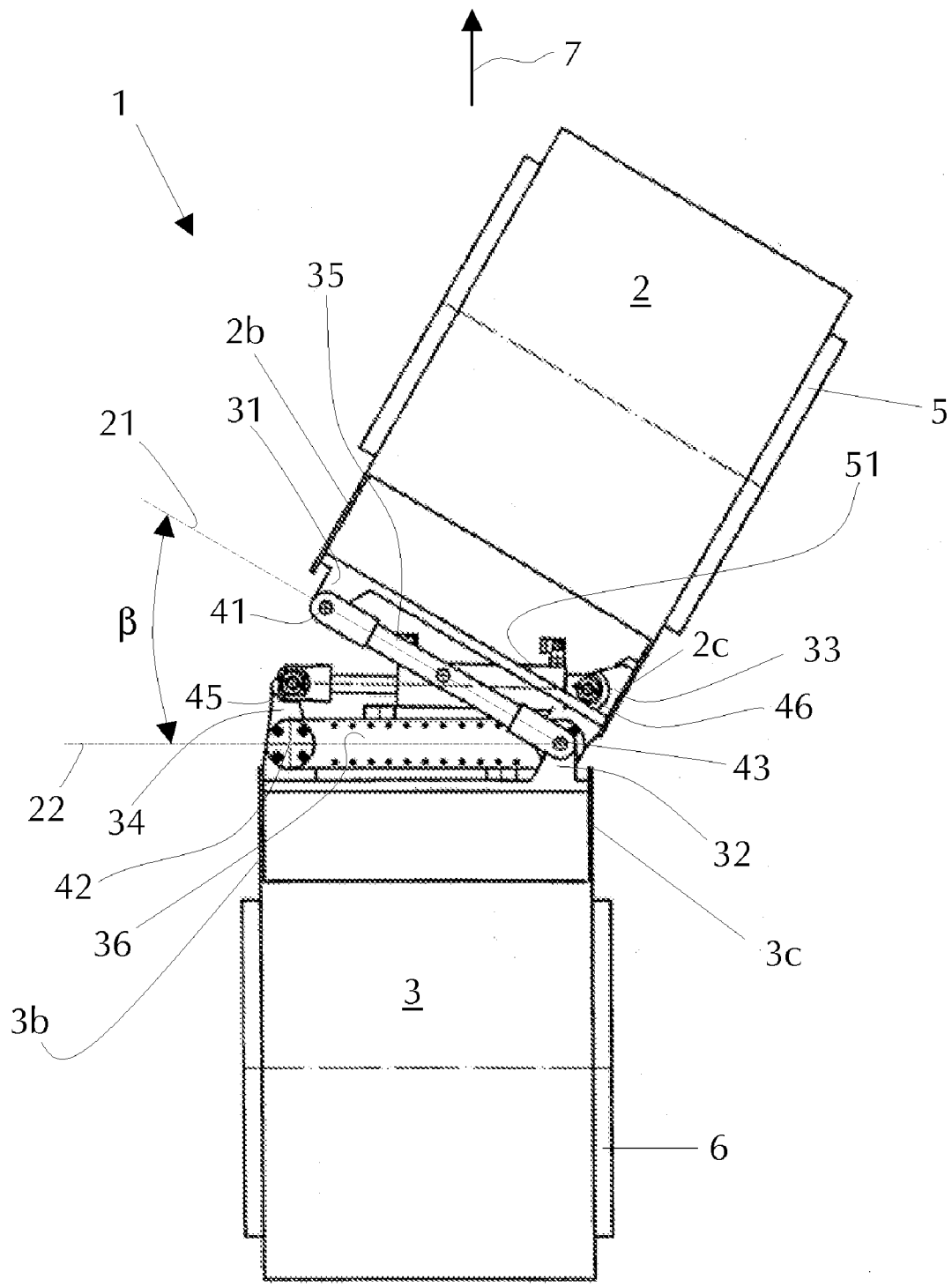
FIG. 7 is a schematic plan view of the vehicle from FIG. 1, albeit in the second steering range.

FIG. 7 is a plan view of the roller 1 in the second steering range. The second steering range encompasses a second steering angle of from 0<β<80°, this steering angle being enclosed by the longitudinal axes 21, 22 which now intersect each other in the second pivot axis 16. If the roller 1 travels in arrow direction 7, then the steering angle β about the second pivot axis 16 leads to a change in the direction of the roller 1 toward the right (viewed in the direction of travel). On viewing of the pure movement of the frames 2, 3 relative to each other by an observer moving with the second pivot axis 16, the right lateral edges 2c, 3c of the frames 2, 3, as viewed in the direction of travel, swivel relative to each other. In this case, the left lateral edges 2b, 3b of the frames 2, 3, as viewed in the direction of travel, move apart, so that the upper rotary joint 41 and the lower rotary joint 42 of the first pair of rotary joints 40a, the axes of rotation of which were previously aligned in the neutral position or in the first steering range, now also move apart from each other. In this exemplary embodiment, in the second steering range, the front frame 2 swivels in relation to the stationary rear frame 3 if the steering turn were performed when the vehicle 1 is stationary. The axes of rotation of the rotary joints 43, 41, 42 now form an isosceles triangle having the triangle side lengths "g" and the angle β at the tip. In this case too, the front tire 5 and the rear tire 6 run in a track.

Figure 8:
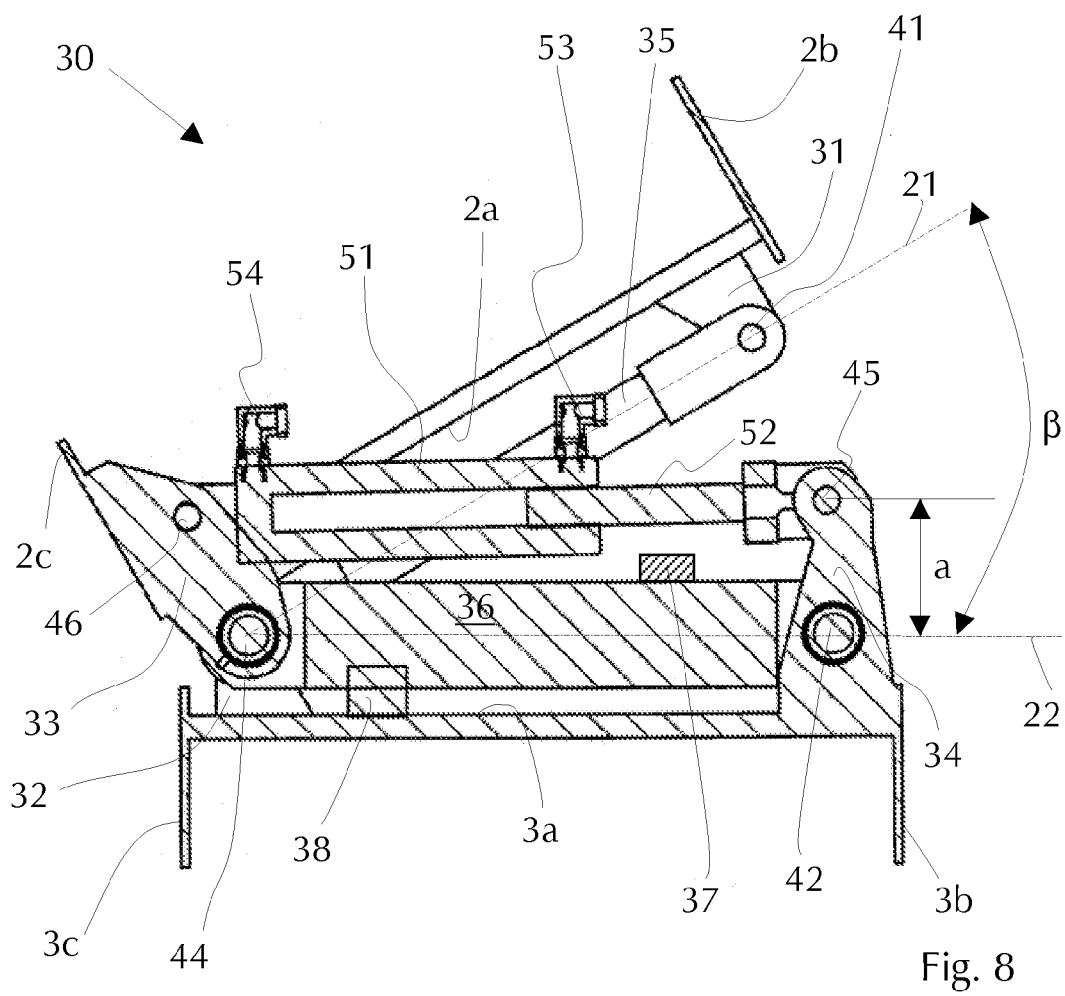
FIG. 8 is a schematic view from below of the pivot steering gear from FIG. 7 with a longitudinal section through plane E2 in the second steering range.

FIG. 8 is a view from below of the pivot steering gear 30 in the second steering range like FIG. 7, albeit with a longitudinal section through the second plane E2, in order to describe the steering state in greater detail. The trigger of the steering movement into the second steering range is also the actuation of the steering drive 50. In this case, in contrast to the steering turn into the first steering range, the actuating forces F2 act outward, i.e. the piston rod 52 of the cylinder 51 strives to leave the cylinder 51 and thus to lengthen the steering drive 50. In this case, the steering square 42, 44, 46, 45 changes its form in such a way that the spacing of the rotary joints 45, 46 is lengthened from originally "l" in the neutral position now to l" (cf. FIG. 9).

Figure 9:
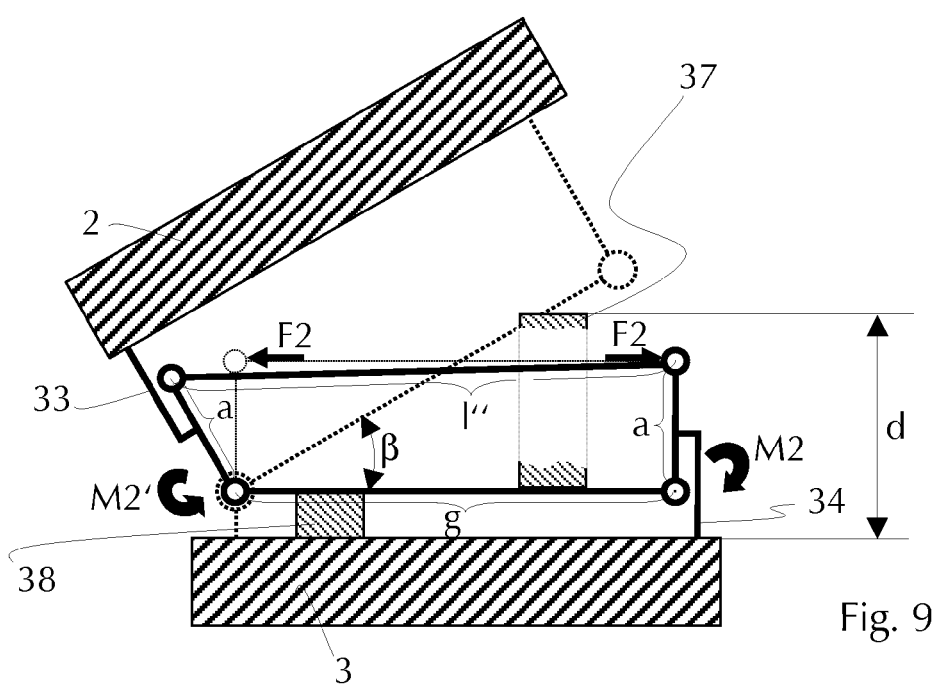
FIG. 9 is a schematic sketch of the steering movement in the second steering range, similar to FIG. 8.

FIG. 9 shows, in a manner similar to FIG. 6, in simplified form the steering principle in the second steering range, like FIG. 8. In this case too, for the sake of clarity, the spacing d/2 between the front frame 2 and the longitudinal axis 22 of the steering plate 36 is increased in size. FIG. 9 shows the pivot steering gear 30 from FIG. 8, the decisive rotary joints again being illustrated as circles and the longitudinal axes of the rigid gear members being illustrated as lines. In addition, the acting actuating forces F2 and also the steering moments M2, M2' are indicated. Likewise, the most important dimensions of the steering square 42, 44, 46, 45 and spacings l", "g," "a," "d" are charted. The stop elements 37, 38 as well as the frames 2, 3 may also be seen.

Starting from the neutral position, the steering movement is introduced into the second steering range as follows. As a result of the hydraulic actuation of the steering drive 50, actuating forces F2 act on the two articulation points of the steering drive 50, that is to say the rotary joints 45, 46. A first steering moment M2 around the rotary joint 42 results from the lever arm having the length "a" on the second steering lever 34, wherein the rotary joint 45 and also the second steering lever 34 are, together with the rear frame 3, substantially shackled and can be moved neither in rotation about the rotary joint 42 nor in translation. The second steering lever 34, the rear frame 3 and also the second stop element 38 together with the steering plate 36 absorb the first force F2 causing the moment M2, the aforementioned machine parts performing substantially no movement. On the opposing side, a second steering moment M2' around the rotary joint 44 acts, as a consequence of the force F2 with the lever arm of length "a," on the first steering lever 33, as a result of which the front frame 2, which is securely connected to the first steering lever 33, swivels freely about the rotary joint 44 by the angle β. In addition, the swiveling movement of the front frame 2 relative to the rear frame 3 is restrictedly guided via the connecting arm 35 and the upper rotary joint 42 which are located in the first plane E1. The rotary joints 43, 44 of the second pair of rotary joints 40b form the second pivot axis 16 for the second steering range. Irrespective of the direction of rotation of the front frame 2 relative to the rear frame 3, each relative rotational movement of the frames 2, 3 in the second steering range only ever takes place about the second pivot axis 16. The actuation of the steering drive 50 leads, as a function of the pressure set, to a displacement of the rotary joint 46, in particular a rotation about the rotary joint 44, so that the variable lateral length of the steering square is increased in size from "l" (neutral position) to l". Provided that the condition applies that l">l, the state is in the second steering range. If β is to be reduced in size again in the direction of the neutral position, then the pressure medium must act on the opposite side of the piston with the aid of the first hydraulic connection. If the neutral position is reached, then the following applies: β=0 and l"=l.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A pivot-steered vehicle, comprising:
a front frame including a front holding part and a front steering lever;
a rear frame including a rear holding part and a rear steering lever;
a pivot steering gear, including:
an arm connected to the front holding part via a first upper rotary joint and to the rear holding part via a second upper rotary joint,
a plate connected to the front steering lever via a first lower rotary joint and to the rear steering lever via a second lower rotary joint, a steering drive connected to the front steering lever via a third lower rotary joint and to the rear steering lever via a fourth lower rotary joint, wherein the pivot steering gear has first and second vertical pivot axes arranged at a distance apart from each other, wherein the pivot steering gear has a first steering range for relative swiveling of the front frame and the rear frame about the first vertical pivot axis, a second steering range for relative swiveling of the front frame and the rear frame about the second vertical pivot axis, and a neutral position separating the first and second steering ranges, and wherein, in the neutral position, a longitudinal axis of the arm is vertically parallel to a longitudinal axis of the plate, rotary axes of the first and second upper rotary joints are arranged coaxially with respect to rotary axes of the first and second lower rotary joints, respectively, and the steering drive is arranged parallel to, and axially spaced apart from, the longitudinal axes of the plate and arm.

2. The vehicle according to claim 1, wherein the steering drive is a double-acting hydraulic cylinder with a piston rod.

3. The vehicle according to claim 1, wherein the pivot steering gear has a first and a second stop element, wherein, in the first steering range, the first stop element rests between the front frame and the plate, and in the second steering range the second stop element rests between the rear frame and the plate.

4. The vehicle according to claim 3, wherein the first and second stop elements are arranged on the plate.

5. The vehicle according to claim 1, wherein, in the neutral position, the front and rear steering levers are arranged opposing each other with respect to a longitudinal centre axis of the vehicle, the and wherein, the plate is articulated via the first and second lower rotary joints so as to be set apart from each other by a spacing corresponding to a length of a lever arm located on the respective steering lever, a steering moment resulting from an actuating force by way of the steering levers on actuation of the steering drive.

6. The vehicle according to claim 5, wherein a steering square is formed by the first, second, third and fourth lower rotary joints, the plate, the steering drive and the front and rear steering levers, and wherein at least one lateral length of the steering square is variably set by altering a length of the steering drive.

7. The vehicle according to claim 1, wherein the pivot steering gear is a flat guide gear.

8. The vehicle according to claim 1, wherein the plate has at least one through-borehole for lines and/or cables.

9. The vehicle according to claim 1, wherein the vehicle is a construction vehicle.

10. The vehicle according to claim 9, wherein the vehicle is a vibratory roller.

11. The vehicle according to claim 10, wherein the vehicle is a trench roller.

* * * * *